US006814417B2

(12) United States Patent
Hartel

(10) Patent No.: US 6,814,417 B2
(45) Date of Patent: Nov. 9, 2004

(54) SWITCHGEAR CABINET

(75) Inventor: Marc Hartel, Reiskirchen (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/204,060

(22) PCT Filed: Feb. 7, 2001

(86) PCT No.: PCT/EP01/01297

§ 371 (c)(1),
(2), (4) Date: Dec. 16, 2002

(87) PCT Pub. No.: WO01/61810

PCT Pub. Date: Aug. 23, 2001

(65) Prior Publication Data

US 2003/0189394 A1 Oct. 9, 2003

(30) Foreign Application Priority Data

Feb. 18, 2000 (DE) .......................................... 100 07 470

(51) Int. Cl.$^7$ .............................................. A47G 29/00
(52) U.S. Cl. ................................ 312/265.2; 312/265.4; 312/223.6; 211/26
(58) Field of Search ........................... 312/265.1, 265.2, 312/265.3, 265.4, 265.5, 223.1, 223.6; 211/26, 175, 189, 169.1, 162, 94.01; 361/605; 174/52.1, 35 R; 248/298.1, 295.11, 244, 424, 27.1

(56) References Cited

U.S. PATENT DOCUMENTS

| | | | | | |
|---|---|---|---|---|---|
| 3,192,306 | A | * | 6/1965 | Skonnord .................... 174/16.1 |
| 3,610,562 | A | * | 10/1971 | Holmes et al. ........... 248/286.1 |
| 4,689,722 | A | * | 8/1987 | Debus et al. ................ 361/725 |
| 4,957,333 | A | * | 9/1990 | Hsu et al. .................... 312/108 |
| 5,292,189 | A | * | 3/1994 | Lau et al. ................. 312/265.3 |
| 5,295,041 | A | * | 3/1994 | Metivier et al. ............. 361/622 |
| 5,574,251 | A | * | 11/1996 | Sevier .......................... 174/50 |
| 5,666,271 | A | * | 9/1997 | Kim et al. .................... 361/726 |
| 5,769,519 | A | * | 6/1998 | Nicolai ...................... 312/351.1 |
| 5,889,648 | A | * | 3/1999 | Heavirland et al. .......... 361/600 |
| 6,097,591 | A | * | 8/2000 | Ircha ........................... 361/683 |
| 6,145,943 | A | * | 11/2000 | Reuter et al. ............. 312/223.1 |
| 6,238,028 | B1 | * | 5/2001 | Benner et al. ............ 312/265.3 |
| 6,401,940 | B1 | * | 6/2002 | Hartel et al. ................... 211/26 |
| 6,439,523 | B1 | * | 8/2002 | Chandler et al. ............ 248/300 |
| 6,462,961 | B1 | * | 10/2002 | Johnson et al. .............. 361/825 |

FOREIGN PATENT DOCUMENTS

| | | | |
|---|---|---|---|
| DE | 2725636 A1 | * 7/1978 | |
| DE | 195 07 728 | 8/1996 | |
| DE | 195 11 639 | 10/1996 | |
| DE | 196 29 422 | 8/1997 | |
| DE | 197 12 362 | 7/1998 | |
| DE | 197 50 427 | 7/1999 | |
| EP | 44282 A2 | * 1/1985 | ........... A47B/47/03 |
| EP | 948 107 | 10/1999 | |

* cited by examiner

Primary Examiner—Lanna Mai
(74) Attorney, Agent, or Firm—Pauley Petersen & Erickson

(57) ABSTRACT

A switchgear cabinet that has a frame stand with vertical frame profiles. According to this invention, a lateral casing is attached on at least one side of the frame stand to two vertical frame profiles that are assigned to the side. A mounting wall is arranged at a distance from the lateral casing while facing the interior of the switchgear cabinet. A cable installation space is formed between the mounting wall and the lateral casing, and the mounting wall is detachably fastened to the frame stand by retaining elements. This invention increases the number of possible ways of installing cables in a switchgear cabinet of this type. Thus, according to this invention the mounting wall is arranged between the vertical frame profiles of the side of the frame stand. An edge cable feedthrough is formed between at least one of the vertical sides of the mounting wall and the assigned vertical frame profile. The mounting wall can be displaced in a horizontal direction on the retaining elements with regard to the vertical frame profiles.

13 Claims, 2 Drawing Sheets

SWITCHGEAR CABINET

BACKGROUND OF THE INVENTION

1. Field of the Invention

This invention relates to a switchgear cabinet with a frame stand that has vertical frame profiles, which on at least one frame stand side of the frame stand a lateral casing is attached to two vertical frame profiles associated with the side, a mounting wall is spaced apart from the lateral casing facing an interior of the switching cabinet, a cable installation space is formed between the mounting wall and the lateral casing, and the mounting wall is detachably fastened to the frame stand by retaining elements.

2. Description of Related Art

A switchgear cabinet is known from German Patent Reference DE 195 07 728 C1. In this case, a mounting plate is used as a mounting wall, which is spaced apart from a rear lateral casing of the switchgear cabinet. In order to insert the mounting plate into the frame stand, guide rails are built into the base region of the switchgear cabinet. The guide rails extend in the direction of the switchgear cabinet depth. With slide elements at its bottom, the mounting plate is placed on the mounting rails and can be slid on them.

A similar apparatus is known from German Patent Reference DE 195 11 639 C1. The mounting plate is slid from the side of the switchgear cabinet, such as in the direction of the switchgear cabinet width.

The prior art also includes mounting rails of the kind disclosed by German Patent Reference DE 196 29 422 C1. The mounting rail has a mounting wall with retaining elements bent away from its longitudinal sides. The mounting rail can be fastened by the retaining elements to two vertical frame profiles of one side of a switchgear cabinet.

SUMMARY OF THE INVENTION

One object of this invention is to provide a switchgear cabinet of the type mentioned above but in which cables or cable supports can be routed and arranged in an organized manner and in which there are numerous possibilities for cable routing.

This object is achieved with a mounting wall disposed between the vertical frame profiles of the frame stand side. An edge cable feedthrough is formed between at least one of the vertical sides of the mounting wall and the associated vertical frame profile. The mounting wall can be moved on the retaining elements horizontally in relation to the vertical frame profiles.

In the vicinity of the edge cable feedthroughs according to this invention, cables can be routed between the switchgear cabinet interior and the cable installation space formed between the mounting wall and the lateral casing. The positioning of the mounting wall and thus the edge cable feedthroughs can also be varied in accordance with the installation circumstances in the switchgear cabinet interior and the quantities of cable to be accommodated.

In one preferred embodiment of this invention, the mounting wall is disposed between horizontal frame profiles of the associated frame stand side of the frame stand. An edge cable feedthrough is formed between at least one of the horizontal sides of the mounting wall and the associated horizontal frame profile. The mounting wall can be moved on the retaining elements in the vertical direction in relation to the vertical frame profiles. In this arrangement, edge cable feedthroughs can also be provided at the horizontal edges of the mounting wall. In particular, with a corresponding formation and dimensioning of the mounting wall, a cable feedthrough region can be produced that bypasses the mounting wall.

For an organized accommodation and routing of the cable, it is possible for the mounting wall to have a flat wall section, which has a grid of cable connector mounts and/or screw receptacles spaced apart from one another in a uniform pattern.

In order to be able to simply achieve the variation of the mounting position, it is possible for the mounting wall, in the vicinity of its two vertical sides, to be fastened to the vertical frame profiles of the frame stand side by the retaining elements, and the retaining elements or the mounting wall to have a number of fastening receptacles led into them, which are associated with the various fastening positions of the mounting wall.

In particular, the retaining elements can have a plate-shaped fastening section that is screw-connected to the mounting wall. The fastening section is adjoined by a flange, which rests against the associated profile side of the vertical frame profile facing the switchgear cabinet interior. At least one hook is punched out from the flange, is bent toward the profile side, and is hooked into fastening receptacles of the profile side. The hooks allow the mounting wall to be simply and precisely hung on the frame stand. The hooks thus form a stable support.

In another embodiment, the retaining elements are formed as mounting rails, which extend between the two vertical frame profiles of the frame stand side and are affixed to them.

In practical applications, it is possible to attach two or more switchgear cabinets to one another. The interior of a switchgear cabinet which is adjacent can be accessed through the adjoining side. For access protection, it is possible to make this access difficult to achieve. Thus, it is possible for the mounting wall, on one of its vertical sides, to adjoin the associated vertical frame profile. In this manner, the mounting wall can be attached, for example, to the front frame profile of the adjoining side. Unauthorized access from the front is thus reliably prevented when the cabinet door is open.

The cable routing possibilities are increased if the mounting wall has at least one cable feedthrough opening, which produces a connection between the switchgear cabinet interior and the cable installation space formed between the lateral casing and the mounting wall.

BRIEF DESCRIPTION OF THE DRAWINGS

This invention is explained in detail in view of exemplary embodiments shown in the drawings, wherein.

DESCRIPTION OF PREFERRED EMBODIMENTS

Figure 1:
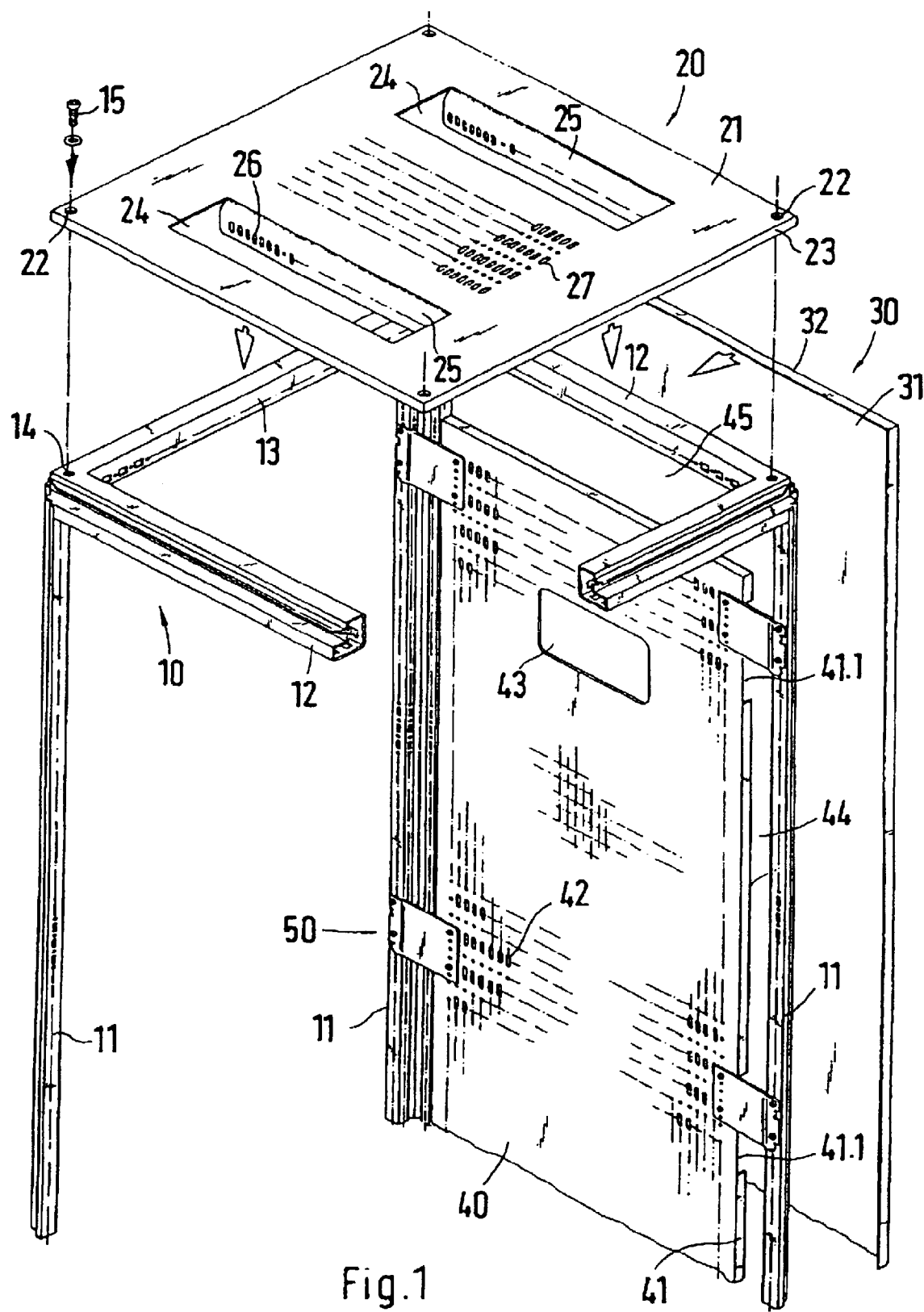
FIG. 1 shows a perspective, partial, exploded view of a frame stand of a switchgear cabinet with a mounting wall.

FIG. 1 shows a frame stand 10 of a switchgear cabinet. The frame stand 10 is comprised of four vertical frame profiles 11 and depth and width struts 12 and 13. The depth and width struts 12 and 13 are connected to the vertical frame profiles 11 in the corner regions of the frame stand 10.

This corner region has a threaded receptacle 14. The threaded receptacle 14 is accessible from the top of the frame stand 10. The top depth and width struts 12 and 13 constitute or form a closed frame which encloses a cover-side opening of the frame stand 10. The opening can be closed by a cover 20. The cover 20 is embodied as a stamped, bent component and has a plate 21. A continuous rim 23 is bent down from the plate 21. Screw openings 22 are provided in the corner regions of the plate 21. The screw openings 22 can be arranged flush with the threaded receptacles 14 of the frame stand 10. The cover 20 can be fastened to the frame stand 10 by fastening screws 15, which are inserted through the screw openings 22 and screwed into the threaded receptacles 14. The cover 20 has two lateral cable feedthrough openings 24 in the vicinity of its plate 21. In order to produce the cable feedthrough openings 24, a flap is stamped out of the plate 21 and bent toward the underside of the cover 20. This flap forms a cable support 25. Slot-shaped fastening receptacles 26 are punched out of the cable support 25. Cables, which are fed into the interior of the switchgear cabinet, can be supported on these fastening receptacles 26. Correspondingly, at least one cable connector can be attached to the fastening receptacles 26. Additional fastening receptacles 27 are punched out of the plate 21 in the region between the two cable feedthrough openings 24. The fastening receptacles 27 are arranged in rows and are spaced apart from each other in a sectional grid. In particular, alternating rows of slotted fastening receptacles and circular punches are provided. The circular punches are used for the insertion of fastening screws.

The frame stand 10 can be enclosed by lateral casings 30. The front of frame stand 10 can have a cabinet door built onto it, which is not shown in the drawing. The lateral casing 30 is embodied as a stamped, bent part and has a vertical wall 31 from which a continuous rim 32 is bent. The lateral casing 30 can be screw-connected to the vertical frame profiles 11 and to the depth and width struts 12 and 13.

Spaced apart from a lateral casing 30, a mounting wall 40 can be fastened in the interior of the switchgear cabinet. The cable mounting wall is embodied as a vertical mounting surface, which has a grid of slot-shaped cable connector mounts 42 and circular holes. As shown in FIG. 1, the entire mounting wall 40 can have the cable connector mounts 42 and the bores. A rectangular opening 43 is punched out near the top of the mounting wall 40. The opening 43 provides access to the cable installation space formed between the cable mounting wall 40 and the lateral casing 30.

The mounting wall 40 has a continuously bent rim 41. The rim 41 has cutouts 41.1 in the region of or near the vertical sides. Mounting rails, which are not shown in detail, can be inserted into the cutouts 41.1. The mounting rails rest with a fastening wall against and are screw-connected to the back of the mounting wall 40. At the longitudinal ends, the mounting rails are coupled to the vertical frame profiles 11. Instead of the mounting rails, in the current exemplary embodiment, retaining elements 50 are used. The embodiment of the retaining elements 50 is shown in more detail from FIG. 2.

As the drawing shows, the retaining elements 50 have a vertical fastening section 51, from which a flange 52 is bent. Hooks 53 are stamped out of the flange 52 and bent toward the back of the retaining element 50. The flange 52 also has bores 54. Other bores embodied or formed as fastening receptacles 55 are led into the fastening section 51.

Figure 2:
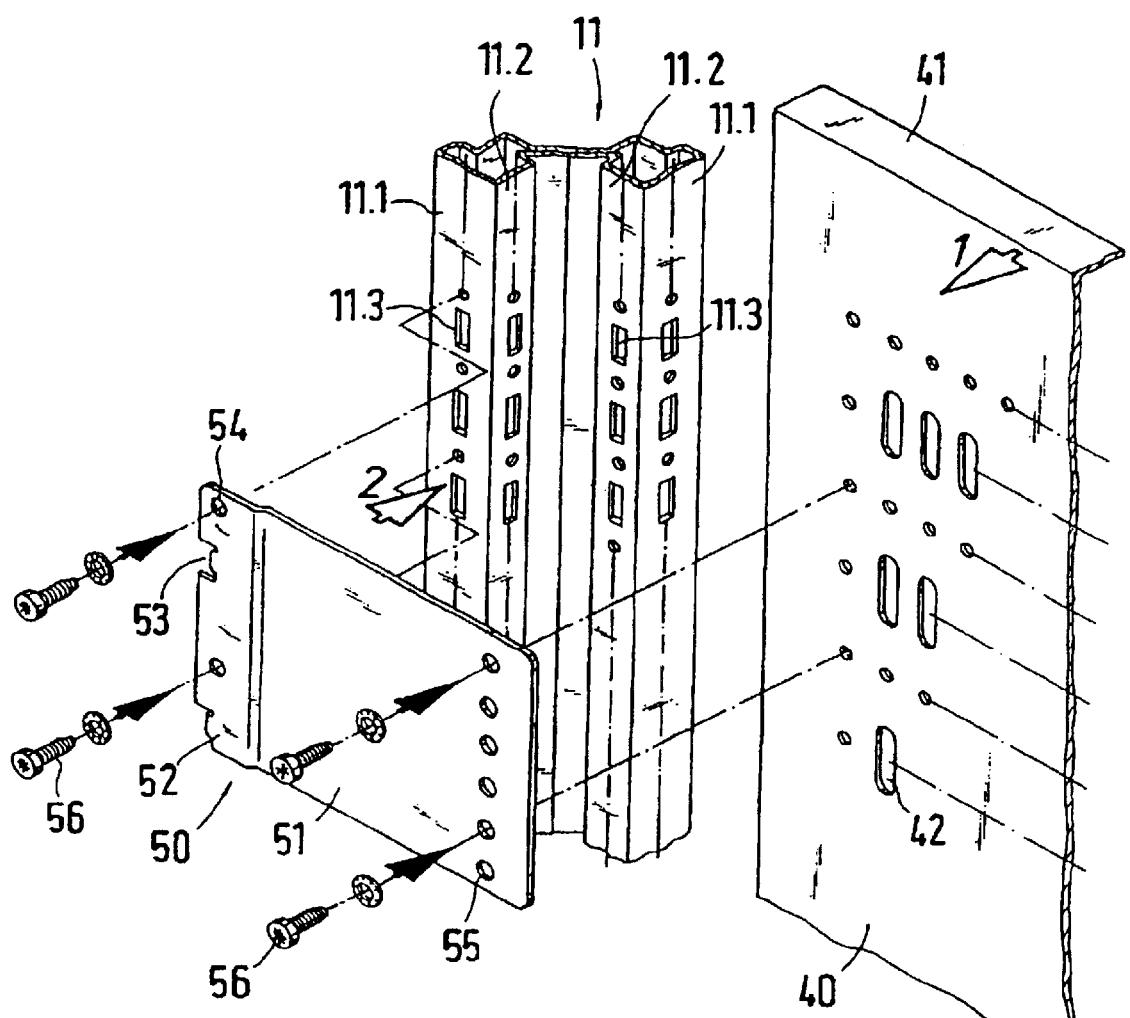
FIG. 2 shows an exploded view of a detail shown in FIG. 1, but with a different embodiment of a retaining element for fastening to the mounting wall.

The retaining elements 50 are screw-connected to the mounting wall 40 in order to affix the mounting wall 40 to the frame stand 10. Thus, the fastening receptacles 55 of the fastening section 51 are disposed flush with bores of the mounting wall 40, as shown in FIG. 2. The retaining element 50 is coupled by fastening screws 56, which are inserted into the fastening receptacles 55 and screwed into the mounting wall 40. When all of the retaining elements 50 are screw-connected, then the hooks 53 of the retaining elements 50 can be used to suspend the mounting wall 40 in slot-shaped fastening receptacles 11.3 of the vertical frame profiles 11. The slot-shaped fastening receptacles 11.3 are led into profile sides 11.1, 11.2 of the vertical frame profile 11. Bores are also provided in the vertical frame profile 11, between the slot-shaped fastening receptacles 11.3. When the retaining element 50 is suspended, the bores are aligned flush with the bores 54 of the flange 52 of the retaining element 50. The retaining element 50 can also be affixed to the vertical frame profile 11 by fastening screws 56.

The vertical frame profiles 11 have four profile sides 11.1, 11.2. Two of the profile sides 11.1 stand vertically in relation to the associated outsides of the switchgear cabinet. The profile sides 11.1 are adjoined at right angles by the profile sides 11.2, which then stand parallel to the associated switchgear cabinet sides. Instead of attaching the mounting wall 40 to the profile sides 11.1, as shown in the embodiment according to FIG. 2, it is also possible to fasten the mounting wall 40 to the outer profile sides 11.2. This shifts the mounting wall 40 closer to the lateral casing 30, thus providing more installation space inside the switchgear cabinet. In particular, the profile sides 11.1 of two adjoining vertical frame profiles can also be used for the attachment of continuous mounting rails, which are then disposed or positioned in front of the mounting wall 40.

As shown in FIG. 1, the mounting wall 40 is dimensioned so that it is disposed in the frame region enclosed by the vertical frame profiles 11 and the depth struts 12. Edge cable feedthroughs 44, 45 are formed between the vertical and horizontal edge regions of the mounting wall 40 and the associated vertical frame profiles 11 and depth struts 12. The cable that is routed in the cable installation space enclosed between the lateral casing 30 and the mounting wall 40 can be fed into the switchgear cabinet interior using the edge cable feedthroughs 44, 45.

As shown in FIG. 1, two parallel rows of fastening receptacles 55 are led into the fastening section 51 of the retaining element 50. It is also possible for a number of rows of fastening receptacles 55 to be used. The different rows of fastening receptacles 55 can be used to position the mounting wall so that it is horizontally offset from the vertical frame profiles 11. It is thus possible to vary the edge cable feedthrough regions 44, 45. The mounting wall 40 can be positioned so that it adjoins the front or rear vertical frame profile 11, and the mounting wall 40 transitions flush into the profile sides 11.1 or 11.2.

The mounting wall 40 can also be offset vertically to permit a variation of the cable feedthrough regions 44, 45. The systematic perforation, circular punches, led into the mounting wall 40 is used for this purpose.

An alternative embodiment of a mounting wall fastening is described in view of FIG. 2. The retaining element 50 has only one row of fastening receptacles 55. This row of fastening receptacles 55 permits the mounting wall 40 to be offset vertically. Now, the systematic perforation of the mounting wall 40 is used to also offset the mounting wall 40 horizontally.

What is claimed is:

1. In a switchgear cabinet with a frame stand having vertical frame profiles, wherein on at least one frame stand side of the frame stand a lateral casing is attached to two of the vertical frame profiles associated with the at least one frame stand side, a mounting wall is spaced apart from the lateral casing facing an interior of the switching cabinet, a cable installation space is formed between the mounting wall and the lateral casing, and the mounting wall is detachably fastened to the frame stand by retaining elements, the improvement comprising: the mounting wall (40) positioned between the vertical frame profiles (11) of the at least one frame stand side, an edge cable feedthrough (44) formed between at least one vertical side of the mounting wall (40) and an associated one of the vertical frame profiles (11), and the mounting wall (40) is moveable on retaining elements (50) horizontally in relation to the vertical frame profiles (11), the mounting wall (40) positioned between horizontal frame profiles (12) of an associated one of the at least one frame stand side of the frame stand (10), an edge cable feedthrough (45) formed between at least one of horizontal sides of the mounting wall (40) and an associated one of the horizontal frame profiles (12), and the mounting wall (40) movable on the retaining elements (50) vertically in relation to the vertical frame profiles (11).

2. In the switchgear cabinet according to claim 1, wherein the mounting wall (40) has a flat wall section with a grid of at least one of cable connector mounts (42) and screw receptacles spaced apart from one another in a uniform pattern.

3. In the switchgear cabinet according to claim 2, wherein the mounting wall (40) near its two vertical sides is fastened to the vertical frame profiles (11) of the at least one frame stand side by the retaining elements (50), and one of the retaining elements (50) and the mounting wall (40) have fastening receptacles (55) associated with various fastening positions of the mounting wall (40).

4. In the switchgear cabinet according to claim 3, wherein the retaining elements (50) have a plate-shaped fastening section (51) which is screw-connected to the mounting wall (40), the fastening section (51) is adjoined by a flange (52) which rests against an associated one of the profile sides (11.1 or 11.2) of the vertical frame profile (11) facing the switchgear cabinet interior, and at least one hook (53) is stamped out of the flange (52) and is bent toward the one of the profile sides (11.1, 11.2) and is hooked into fastening receptacles (11.3) of one of the profile sides (11.1).

5. In the switchgear cabinet according to claim 3, wherein the retaining elements (50) extend between and are affixed to the two vertical frame profiles (11) of the at least one frame stand side.

6. In the switchgear cabinet according to claim 5, wherein the mounting wall (40) on one of its vertical sides adjoins an associated one of the vertical frame profiles.

7. In the switchgear cabinet according to claim 6, wherein the mounting wall (40) has at least one cable feedthrough opening which produces a connection between the switchgear cabinet interior and the cable installation space formed between the lateral casing (30) and the mounting wall (40).

8. In the switchgear cabinet according to claim 1, wherein the mounting wall (40) has a flat wall section with a grid of at least one of cable connector mounts (42) and screw receptacles spaced apart from one another in a uniform pattern.

9. In the switchgear cabinet according to claim 1, wherein the retaining elements (50) extend between and are affixed to the two vertical frame profiles (11) of the at least one frame stand side.

10. In the switchgear cabinet according to claim 1, wherein the mounting wall (40) has at least one cable feedthrough opening which produces a connection between the switchgear cabinet interior and the cable installation space formed between the lateral casing (30) and the mounting wall (40).

11. In a switchgear cabinet with a frame stand having vertical frame profiles, wherein on at least one frame stand side of the frame stand a lateral casing is attached to two of the vertical frame profiles associated with the at least one frame stand side, a mounting wall is spaced apart from the lateral casing facing an interior of the switching cabinet, a cable installation space is formed between the mounting wall and the lateral casing, and the mounting wall is detachably fastened to the frame stand by retaining elements, the improvement comprising: the mounting wall (40) positioned between the vertical frame profiles (11) of the at least one frame stand side, an edge cable feedthrough (44) formed between at least one vertical side of the mounting wall (40) and an associated one of the vertical frame profiles (11), and the mounting wall (40) is moveable on retaining elements (50) horizontally in relation to the vertical frame profiles (11), the mounting wall (40) near its two vertical sides fastened to the vertical frame profiles (11) of the at least one frame stand side by the retaining elements (50), and one of the retaining elements (50) and the mounting wall (40) having fastening receptacles (55) associated with various fastening positions of the mounting wall (40).

12. In the switchgear cabinet according to claim 11, wherein the retaining elements (50) have a plate-shaped fastening section (51) which is screw-connected to the mounting wall (40), the fastening section (51) is adjoined by a flange (52) which rests against an associated one of the profile sides (11.1 or 11.2) of the vertical frame profile (11) facing the switchgear cabinet interior, and at least one hook (53) is stamped out of the flange (52) and is bent toward the one of the profile sides (11.1, 11.2) and is hooked into fastening receptacles (11.3) of one of the profile sides (11.1).

13. In a switchgear cabinet with a frame stand having vertical frame profiles, wherein on at least one frame stand side of the frame stand a lateral casing is attached to two of the vertical frame profiles associated with the at least one frame stand side, a mounting wall is spaced apart from the lateral casing facing an interior of the switching cabinet, a cable installation space is formed between the mounting wall and the lateral casing, and the mounting wall is detachably fastened to the frame stand by retaining elements, the improvement comprising: the mounting wall (40) positioned between the vertical frame profiles (11) of the at least one frame stand side, an edge cable feedthrough (44) formed between at least one vertical side of the mounting wall (40) and an associated one of the vertical frame profiles (11), and the mounting wall (40) is moveable on retaining elements (50) horizontally in relation to the vertical frame profiles (11), and the mounting wall (40) on one of its vertical sides adjoining an associated one of the vertical frame profiles.

* * * * *